US009405978B2

(12) United States Patent
Besterman et al.

(10) Patent No.: US 9,405,978 B2
(45) Date of Patent: Aug. 2, 2016

(54) PRIORITIZATION OF FACIAL RECOGNITION MATCHES BASED ON LIKELY ROUTE

(71) Applicant: GLOBALFOUNDRIES INC, Grand Cayman (KY)

(72) Inventors: Paula Besterman, Cary, NC (US); Adrian X. Rodriguez, Durham, NC (US); Pamela S. Ross, Raleigh, NC (US); Eric Woods, Durham, NC (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 364 days.

(21) Appl. No.: 13/914,589

(22) Filed: Jun. 10, 2013

(65) Prior Publication Data
US 2014/0363046 A1    Dec. 11, 2014

(51) Int. Cl.
*G06K 9/00* (2006.01)

(52) U.S. Cl.
CPC ........ *G06K 9/00771* (2013.01); *G06K 9/00288* (2013.01)

(58) Field of Classification Search
CPC . H04N 7/181; H04N 9/3194; H04N 21/4415; G06K 9/00362; G06K 9/0061; G06K 9/00281; G06K 9/3216; G06K 9/00771; G06K 9/00288; G06K 2017/0045
USPC ................. 348/152, 143, 156, 153, 161, 142; 382/116
See application file for complete search history.

(56) References Cited

U.S. PATENT DOCUMENTS

| 6,976,032 | B1 * | 12/2005 | Hull | G06Q 10/10 |
| 2007/0082674 | A1 * | 4/2007 | Pedersen | H04B 7/026 455/450 |
| 2007/0109134 | A1 * | 5/2007 | Dugan | G07C 9/00111 340/573.1 |
| 2007/0216764 | A1 * | 9/2007 | Kwak | H04L 12/64 348/14.06 |
| 2008/0042824 | A1 * | 2/2008 | Kates | G08B 13/183 340/522 |

(Continued)

FOREIGN PATENT DOCUMENTS

| EP | 002026233 A1 | 2/2009 |
| JP | 02001016418 A | 1/2001 |
| WO | WO03046810 A1 | 6/2003 |

OTHER PUBLICATIONS

Kota, Kalyana et al; "Automatic setting of ratings based on facial recognition"; Jun. 15, 2011; Sony Electronics Inc.; IP.com No. IPCOM000207861D.

(Continued)

*Primary Examiner* — Helen Shibru
(74) *Attorney, Agent, or Firm* — DeLio, Peterson & Curcio, LLC; David R. Pegnataro

(57) ABSTRACT

Prioritizing facial recognition matches includes obtaining identification information and a facial image for each visitor entering the monitored environment, the monitored environment having a plurality of cameras at known locations including entry and exit points; obtaining itineraries of the visitors. Itineraries of the visitors are obtained, and based on the entry points and the itineraries of the visitors, likely routes of the visitors are determined through the monitored environment. Responsive to receiving an image captured by a first camera at a first location at an image capture time, the database records are sorted for facial recognition matching with the image from the first camera based on the visitors whose routes are likely to place the visitors in proximity to the first camera at the time of image capture.

19 Claims, 2 Drawing Sheets

(56) References Cited

U.S. PATENT DOCUMENTS

| | | | |
|---|---|---|---|
| 2009/0079824 A1* | 3/2009 | Winsor | G01S 3/7864 348/143 |
| 2009/0171478 A1* | 7/2009 | Wong | G08G 1/04 700/13 |
| 2010/0007763 A1 | 1/2010 | Yokohata | |
| 2010/0141788 A1 | 6/2010 | Hwang et al. | |
| 2011/0310039 A1 | 12/2011 | Kim | |
| 2012/0002849 A1 | 1/2012 | Tokuse | |
| 2012/0176496 A1* | 7/2012 | Carbonell | H04N 7/181 348/143 |
| 2013/0039634 A1* | 2/2013 | M | G08B 13/19645 386/230 |
| 2013/0057693 A1* | 3/2013 | Baranek | G06K 9/00771 348/152 |
| 2013/0243246 A1* | 9/2013 | Lao | G06K 9/00255 382/103 |
| 2014/0176668 A1* | 6/2014 | Boucourt | B64D 45/0015 348/36 |
| 2014/0363057 A1* | 12/2014 | Eckel | G06F 21/32 382/116 |

OTHER PUBLICATIONS

Delin Sun et al; "Identification and Classification of Facial Familiarity in Directed Lying: An ERP Study"; PLoS One 7(2): e31250. doi:10.1371/journal.pone.0031250.

* cited by examiner

PRIORITIZATION OF FACIAL RECOGNITION MATCHES BASED ON LIKELY ROUTE

BACKGROUND

Facial recognition is typically performed by a software application that automatically identifies a person from a digital image (including a video frame) by comparing selected facial features from the digital image to a facial database.

Facial recognition is typically deployed for security reasons and therefore accuracy is of paramount importance. The accuracy of facial recognition, however, may suffer when the facial recognition software attempts to perform facial recognition matching of an image of a person taken in a crowd to a facial database having known facial images, where the captured image is influenced by image quality, capture angle, and the person's immediate appearance (e.g., glasses, hat, facial hair, and the like). In this case, the software must attempt to match the captured image with a potentially large number of known images, thereby decreasing the speed and/or accuracy of potential matches.

Accordingly, it would be desirable to provide a method and system for prioritizing facial recognition matching.

BRIEF SUMMARY

The exemplary embodiments provide methods and systems for prioritizing facial recognition matches. Aspects of exemplary embodiment include obtaining identification information and a facial image for each visitor entering the monitored environment, wherein the monitored environment has a plurality of cameras at known locations including entry and exit points. Itineraries of the visitors are obtained, and based on the entry points and the itineraries of the visitors, likely routes of the visitors are determined through the monitored environment. Responsive to receiving an image captured by a first camera at a first location at an image capture time, the database records are sorted for facial recognition matching with the image from the first camera based on the visitors whose routes are likely to place the visitors in proximity to the first camera at the time of image capture.

DETAILED DESCRIPTION

The exemplary embodiment relates to prioritizing facial recognition matching. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The exemplary embodiments provide methods and systems for prioritizing facial recognition matching. The exemplary embodiments recognize that facial recognition software would be more effective when the facial image database people is known and relatively small. Accordingly, the exemplary embodiments provide a method and system of prioritizing potential matches of a facial recognition system to enhance recognition accuracy and security.

Figure 1:
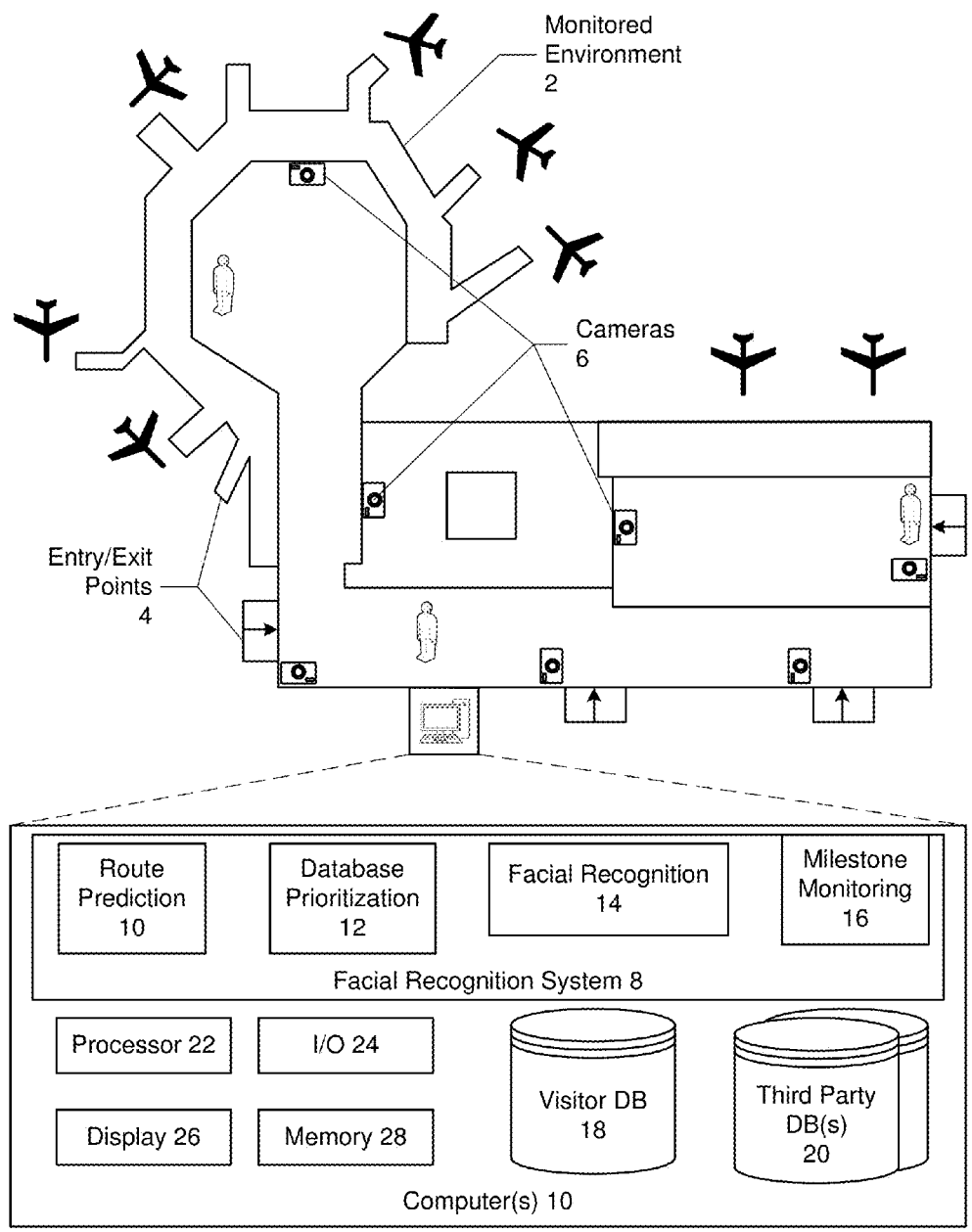
FIG. 1 is a diagram illustrating one embodiment of a system for prioritizing facial recognition matching.

FIG. 1 is a diagram illustrating one embodiment of a system for prioritizing facial recognition matching. According to the exemplary embodiment, the system comprises a monitored environment 2 and one or more computers(s) 10 for performing facial recognition matching. The monitored environment 2 includes a plurality of entry/exit points 4 and multiple cameras 6 positioned at locations throughout the monitored environment 2. In one embodiment, the cameras 6 may comprise video cameras and/or digital still cameras. In one embodiment, the cameras 6 may be capable of capturing both video and still images. Images captured by the cameras 6 are transferred to the computer(s) 10.

The system also further comprises a facial recognition system 8 executing on the computer(s) 10 for facial recognition matching of the images captured by the cameras 6. In one embodiment, software components of the facial recognition system 8 may include a route prediction component 10, a database prioritization component 12, a facial recognition component 14, and a milestone monitoring component 16. The facial recognition system 8 may further comprise a visitor database 18 and may access and one of more third-party databases 20, such as airline reservations and GPS data. In one exemplary embodiment, the monitored environment 2 may comprise an airport, and the facial recognition system 8 may be used to track visitors as the visitors move throughout the airport.

Unlike previous facial recognition systems that monitor the movement of visitors by attempting to match current images taken by cameras against a large number of known images from a facial image database, the exemplary embodiment prioritizes and sorts potential matches for the facial recognition based on predicted movements or routes of the visitors. In one embodiment, the facial recognition system 8 maintains facial images records of the visitors in the monitored environment 2 in the visitor database 18 and predicts likely routes of the visitors through the monitored environment 2 between the entry and exit points 4. The likely routes of the visitors may then be used to constrict potential matches for the facial recognition system as images are captured by cameras 6, and/or to weight possible facial recognition matches based on expected visitor behavior. Narrowing the potential matches in the facial recognition system 8 may enhance recognition accuracy and may increase security of the monitored environment 2.

Although the monitored environment 2 may be described herein as an airport, the exemplary embodiments are not limited thereto. For example, the monitored environment 2 may comprise any predefined area having a limited number of entry and exit points 4 including, but not limited to, shopping malls, highways, subways, and stadiums for example.

Although the route prediction component 10, the database prioritization component 12, the facial recognition component 14, and the milestone monitoring component 16 are shown as separate components, the functionality of each may be combined into a lesser or greater number of modules/components. In addition, the computer(s) 10 may be located on-site at the monitored environment 2, or located remotely therefrom. In one embodiment, the computer(s) 10 may comprise a desktop computer, a server, or a client/-server system.

The computer(s) 10 may include hardware components of typical computing devices, including a processor 22, input/output (I/O) devices 24 (e.g., keyboard, pointing devices, and the like), display 26 and memory 28. In one embodiment, the memory 28 may comprise any combination of computer-readable media, e.g., memory and storage devices (e.g., flash memory, hard drive, optical disk drive, magnetic disk drive, and the like) containing computer instructions that implement the functionality disclosed when executed by the processor 22. The computer(s) 10 may further include wired or wireless network communication interfaces (not shown) for communication (e.g., for receiving images taken by the camera 6).

The processor 22 may be part of a larger data processing system suitable for storing and/or executing program code that may include multiple processes coupled directly or indirectly to memory elements through a system bus (not shown). The memory elements can include local memory employed during actual execution of the program code, bulk storage, and cache memories which provide temporary storage of at least some program code in order to reduce the number of times code must be retrieved from bulk storage during execution.

The I/O devices 24 can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 2:
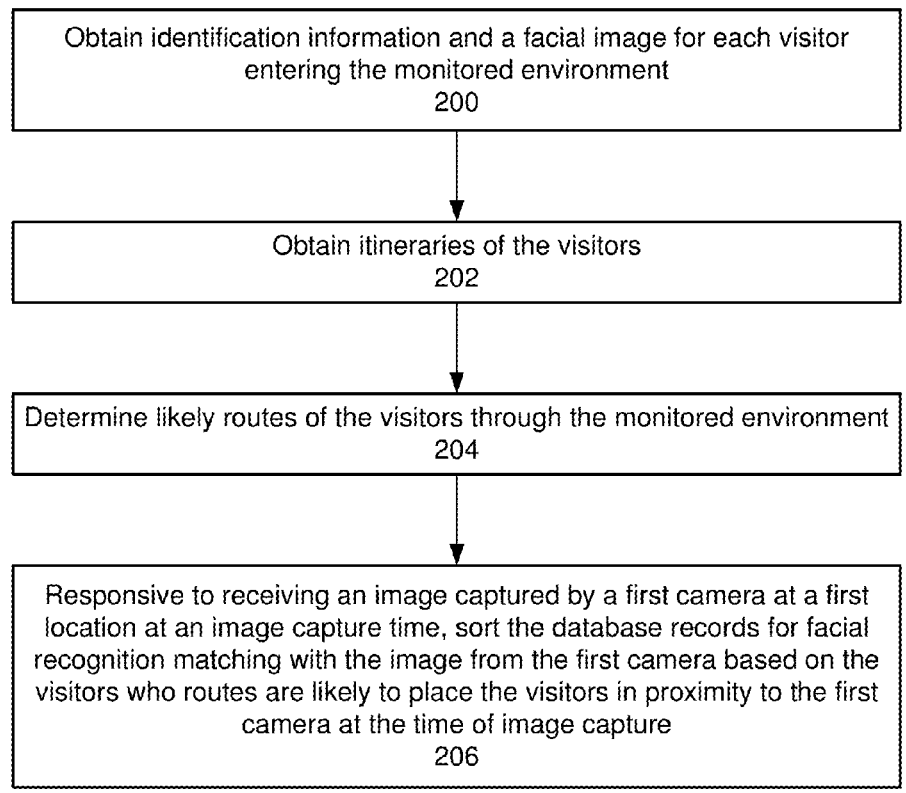
FIG. 2 is a flow diagram illustrating one embodiment of a process for prioritizing facial recognition matching.

FIG. 2 is a flow diagram illustrating one embodiment of a process for prioritizing facial recognition matching. The process may begin by obtaining identification information and a facial image for each visitor entering the monitored environment (block 200).

In one embodiment, the identification information of the visitors may be obtained when the visitors arrive at one of the entry/exit points 4 and/or check-in. The identification information and the facial image may be received directly from the visitors or from one more databases. The received identification information and facial image may then be stored in and stored in the visitor database 18. For example, upon entry at a security checkpoint, a visitor may be required to show an ID (e.g., driver's license, passport, and the like). The identification information may be entered manually into the visitor database 18 and/or used to look up identification information from the third party database 20. In a further aspect of the exemplary embodiment, the facial image of the visitor may be retrieved from a social networking website such as LinkedIn™ or Facebook™. The facial image of the visitor may also be obtained by taking a picture of the visitor, scanning the picture from an ID of the visitor, or retrieving an image of the visitor from the third-party database 20. The visitor's identification information may be associated with the visitor's image in a record for the visitor in the visitor database 18. In one embodiment, the specific entry/exit points 4 where the visitors arrive and check-in may also be stored in the visitor database 18.

In a further embodiment, itineraries of the visitors also may be obtained (block 202). The itinerary of the visitors may be retrieved from the third-party database 20 (e.g., an airline reservation system) or received directly from the visitors. In one embodiment, an itinerary may also include historical trip data, common destinations, itineraries or recently visited places of "friends" or related travelers, and destinations or way points that may be inferred from other devices, such as traffic cameras etc., for example.

The itinerary may specify, or used to infer, an exit point within the monitored environment 2 and a departure time. An example of an itinerary is a ticket or boarding pass showing a flight number, a departure time, and a departure gate. In one embodiment, the itineraries of the visitors are associated and stored with a record for each of the visitors in the visitor database 18. If the itinerary does not specify the exit point within the monitored environment 2, then the itinerary of the visitor may be used to determine the exit point of the visitor in the monitored environment 2.

Based on the entry points and the itineraries of the visitors, the facial recognition system 8 determines likely routes of the visitors through the monitored environment (block 204).

In an airport environment, the route prediction component 10 may use the entry points of each of the visitors, exit points (e.g., departure gates) and departure times to calculate routes that the visitors are likely to take through the monitored environment 2. In one embodiment, the route prediction component 10 may also consider transitory methods and alternative routes when calculating the routes, such as elevators, shuttles, and assisted walk lanes; common stops along the route; and mined social data to determine if the visitor is hungry/thirsty or tired and therefore likely to stop.

In a further embodiment, changes to exit points assigned to the visitors may be received in real time and used to update the calculated routes to the exit points. For example in an airport environment, gate changes may be received from the third-party database 20 (e.g., airline reservation system) and used to update the calculated routes to the departures gates. In addition, the route prediction component 10 may be made aware of the mode of travel of the visitors, such as walking, automobile, and the like, through the monitored environment 2, and uses the mode of travel when calculating the routes. In one embodiment, routes and way points may be recalculated based on previous sightings or destinations, e.g., if the visitor just ate, it is not likely the visitor will stop to eat again in the near future.

As the visitors move through the monitor environment 2, the cameras 6 located at known positions may continuously take pictures of the visitors. Responsive to receiving an image captured by a first camera at a first location at an image capture time, the facial recognition system 14, sorts the database records for facial recognition matching with the image from the first camera base on the visitors who routes are likely to place the visitors in proximity to the first camera at the time of image capture (block 206).

In one embodiment, sorting the visitor database may first include analyzing the likely routes of the visitors to determine a position probability of each of the visitors being in proximity to the location of the first camera at the time of image capture. Thereafter, the visitor records in the visitor database may be prioritized for facial recognition matching with the image from the first camera based on the visitors determined to have highest position probabilities.

In one embodiment, the facial recognition system 8 may determine the location of the camera the captured image using a camera location database. Alternatively, the cameras 6 may tag the images with a location or camera ID.

In a further embodiment, the position probabilities based on likely routes of the visitors may be augmented using information retrieved from social networking websites. For example if a position probability of a visitor being in a food court is high based on their likely route, and it is determined from the social networking site that that user has just posted that they like the dish they are eating, the facial recognition system 8 may increase the position probability of that visitor being in the food court.

In one embodiment, the route prediction component 10 may determine the position probabilities of each of visitors. In an alternative embodiment, the database prioritization 12 may determine the position probabilities. In one embodiment, the database prioritization component 12 may prioritize the facial images in the visitor database 18. Thereafter, the facial recognition component 14 may compare the captured image to the prioritized images in the visitor database to find potential matches.

As an example of the above process, assume that the facial recognition system 8 receives pictures taken by a camera in Terminal C of an airport. The route prediction component 10 would find visitors records in the visitor database 18 having the highest probability of a route that goes through, or in proximity to, Terminal C. The database prioritization component 12 would then sort the records in the visitor database 18 so that the facial recognition component 14 attempts to match the pictures with the images of the visitors having the highest probability of being in Terminal C around the time the picture is taken. In this way, the facial recognition system 8 can find matches faster than analyzing images of the records of all the visitors in the visitor database 18 that could possibly be in the airport.

Referring again to FIG. 2, once the facial recognition component 14 finds a match in the visitor database 18 for the image captured by one of the cameras, the visitor in the image is identified based on the identification information associated with the matching image.

According to an exemplary embodiment, the milestone monitoring component 16 may verify whether route milestones for the visitors are met or unmet. This may be accomplished by determining if an identified visitor has a route that is likely to place the visitor in proximity to the camera at the time of image capture. If so, then the milestone monitoring component 16 may mark the identified visitor in the visitor database 18 as verified for being detected at an anticipated location at an anticipated time. The route can also be updated to reflect a new route from a current verified location (e.g., a mid-point) to the end point. This will reduce the total route size from the original start point to the end point.

According to another exemplary embodiment, once one of the visitors is identified from a captured image, the facial recognition system 8 may also present the identified visitor with personalized content. For example, in one embodiment, the identified visitor may be presented with personalized advertisements as an identified visitor passes. In another embodiment, the identified visitor may be presented with flight status to display the identified visitor's flight information or alerts. In one embodiment, the personalized content may be displayed on display screens as the identified visitor passes by. In an alternative embodiment, collective profiles of identified visitors may be presented with personalized advertisements or status information. In another embodiment, the personalized content may be sent to an electronic device of the identified visitor, such as a smartphone or smart watch, for example.

According to another exemplary embodiment, for each of the visitors who has a route that is likely to place the visitor in proximity to the camera around the time of image capture, but has yet to be identified, the milestone monitoring component 16 may mark the visitor as unverified in the visitor database. In response, the facial recognition system may search for the unverified visitor using cameras 6 in other locations within the monitored environment 2.

In yet a further embodiment, once visitors are detected exiting the monitored environment 2 through one of the entry/exit points 4, the milestone monitoring component 16 may mark the visitor as exited and remove or lower the visitors' priority in the visitor database 18. An example of detecting an exiting visitor is when a boarding pass of the visitor is scanned at a gate as the visitor boards an airplane or when the visitor is identified using a camera over the gate. In this case, the visitor is marked as exited and either removed the visitor database 18 or placed at the bottom of a list visitors eligible for future facial recognition matching.

A method and system for prioritizing facial recognition matching has been disclosed. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for prioritizing facial recognition matches, comprising:
    obtaining identification information and a facial image for each visitor entering a monitored environment, the monitored environment having a plurality of cameras at known locations throughout the monitored environment including entry and exit points;
    obtaining itineraries of the visitors;
    based on the entry points and the itineraries of the visitors, determining likely routes of the visitors through the monitored environment; and
    responsive to receiving an image captured by a first camera at a first location at an image capture time, sorting visitor database records for facial recognition matching with the image from the first camera based on the visitors whose routes are likely to place the visitors in proximity to the first camera at the time of image capture.

2. The method of claim 1, wherein determining likely routes of the visitors through the monitored environment further comprises: using the entry points of each of the visitors, exit points and departure times to calculate routes that the visitors are likely to take through the monitored environment.

3. The method of claim 2, further comprising receiving changes to exit points assigned to the visitors in real time and recalculating the routes that the visitors are likely to take through the monitored environment.

4. The method of claim 1, wherein sorting the visitor database further comprises:
    analyzing the likely routes of the visitors to determine a position probability of each of the visitors being in proximity to the location of the first camera at the time of image capture; and
    prioritizing visitor records in the visitor database for facial recognition matching with the image from the first camera based on the visitors determined to have highest position probabilities.

5. The method of claim 4, further comprising augmenting the position probabilities based on the likely routes of the visitors using information retrieved from social networking websites.

6. The method of claim 1 further comprising:
    once a match is found in the visitor database for the first image captured by the first camera, identifying the visitor in the image based on the identification information associated with the matching image; and
    responsive to determining if the identified visitor has a route that is likely to place the visitor in proximity to the first camera at the time of image capture, marking the identified visitor in the visitor database as verified for being detected at an anticipated location at an anticipated time.

7. The method of claim 1, further comprising: once one of the visitors is identified in the first image, presenting the identified visitor or collective profiles of identified visitors with personalized content, wherein the personalized content comprises at least one of personalized advertisements and flight screen status.

8. The method of claim 1, further comprising: for each of the visitors who has a route that is likely to place the visitor in proximity to the first camera around the time of image capture, but has yet to be identified, marking the visitor as unverified in the visitor database; and searching for the unverified visitor using cameras in other locations within the monitored environment.

9. The method of claim 1, further comprising: once visitors are detected exiting the monitored environment through one of the entry and exit points, marking the visitor as exited and removing or lowering the visitors' priority in the visitor database.

10. A system, comprising:
    a memory;
    a processor coupled to the memory; and
    a software component executed by the processor that is configured to:
        obtain identification information and a facial image for each visitor entering a monitored environment, the monitored environment having a plurality of cameras at known locations throughout the monitored environment including entry and exit points;
        obtain itineraries of the visitors;
        based on the entry points and the itineraries of the visitors, determine likely routes of the visitors through the monitored environment; and
        responsive to receiving an image captured by a first camera at a first location at an image capture time, sort visitor database records for facial recognition matching with the image from the first camera based on the visitors whose routes are likely to place the visitors in proximity to the first camera at the time of image capture.

11. The system of claim 10, wherein the software component is further configured to determine likely routes of the visitors through the monitored environment by: using the entry points of each of the visitors, exit points and departure times to calculate routes that the visitors are likely to take through the monitored environment.

12. The system of claim 11, wherein the software component is further configured to: receive changes to exit points assigned to the visitors in real time and recalculate the routes that the visitors are likely to take through the monitored environment.

13. The system of claim 10, wherein the software component is further configured to:
analyze the likely routes of the visitors to determine a position probability of each of the visitors being in proximity to the location of the first camera at the time of image capture; and
prioritize visitor records in the visitor database for facial recognition matching with the image from the first camera based on the visitors determined to have highest position probabilities.

14. The system of claim 13, wherein the position probabilities are augmented based on the likely routes of the visitors using information retrieved from social networking websites.

15. The system of claim 10, wherein the software component is further configured to:
once a match is found in the visitor database for the first image captured by the first camera, identify the visitor in the image based on the identification information associated with the matching image; and
responsive to determining if the identified visitor has a route that is likely to place the visitor in proximity to the first camera at the time of image capture, mark the identified visitor in the visitor database as verified for being detected at an anticipated location at an anticipated time.

16. The system of claim 10, wherein once one of the visitors is identified in the first image, the identified visitor or collective profiles of identified visitors is presented with personalized content, wherein the personalized content comprises at least one of personalized advertisements and flight screen status.

17. The system of claim 10, wherein for each of the visitors who has a route that is likely to place the visitor in proximity to the first camera around the time of image capture, but has yet to be identified, the visitor is marked as unverified in the visitor database; and searched for the unverified visitor using cameras in other locations within the monitored environment.

18. The system of claim 10, wherein once visitors are detected exiting the monitored environment through one of the entry and exit points, the visitor is marked as exited and remove or lower the visitors' priority in the visitor database.

19. A tangible, non-transitory computer-readable medium comprising program instructions for prioritizing facial recognition matches, the program instructions comprising:
obtaining identification information and a facial image for each visitor entering a monitored environment, the monitored environment having a plurality of cameras at known locations throughout the monitored environment including entry and exit points;
obtaining itineraries of the visitors;
based on the entry points and the itineraries of the visitors, determining likely routes of the visitors through the monitored environment; and
responsive to receiving an image captured by a first camera at a first location at an image capture time, sorting visitor database records for facial recognition matching with the image from the first camera based on the visitors whose routes are likely to place the visitors in proximity to the first camera at the time of image capture.

* * * * *